(12) United States Patent
Chen (10) Patent No.: US 11,982,909 B2
(45) Date of Patent: May 14, 2024

(54) METHOD FOR MANUFACTURING A LIQUID CRYSTAL DISPLAY PANEL AND A LIQUID CRYSTAL DISPLAY PANEL

(71) Applicant: TCL CHINA STAR OPTOELECTRONICS TECHNOLOGY CO., LTD., Guangdong (CN)

(72) Inventor: Hao Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 288 days.

(21) Appl. No.: 17/600,510

(22) PCT Filed: Aug. 30, 2021

(86) PCT No.: PCT/CN2021/115210
§ 371 (c)(1),
(2) Date: Sep. 30, 2021

(87) PCT Pub. No.: WO2023/000438
PCT Pub. Date: Jan. 26, 2023

(65) Prior Publication Data
US 2023/0020500 A1    Jan. 19, 2023

(30) Foreign Application Priority Data
Jul. 19, 2021   (CN) .......................... 202110814135.1

(51) Int. Cl.
*G02F 1/1339* (2006.01)
*B24B 9/14* (2006.01)
*G02F 1/1333* (2006.01)

(52) U.S. Cl.
CPC .............. *G02F 1/1339* (2013.01); *B24B 9/14* (2013.01); *G02F 1/133351* (2013.01); *G02F 2201/56* (2013.01); *G02F 2202/28* (2013.01)

(58) Field of Classification Search
None
See application file for complete search history.

(56) References Cited

U.S. PATENT DOCUMENTS

| 2003/0123016 A1 | 7/2003 | Kim |
| 2003/0169392 A1 | 9/2003 | Park et al. |
| 2007/0195255 A1 | 8/2007 | Cho et al. |
| 2013/0075357 A1* | 3/2013 | Tannas, Jr. ........ G02F 1/133351 216/13 |

(Continued)

FOREIGN PATENT DOCUMENTS

| CN | 103433824 A | 12/2013 |
| CN | 108873496 A | 11/2018 |
| CN | 109839772 A | 6/2019 |

(Continued)

*Primary Examiner* — Ashok Patel
(74) *Attorney, Agent, or Firm* — HSML P.C.

(57) ABSTRACT

A method for manufacturing a liquid crystal display panel and a liquid crystal display panel are provided. The method of manufacturing a liquid crystal display panel comprises the following steps: grinding the display device along a preset edge and removing the adhesive layer on a side of the preset edge away from a frame sealant, to obtain the liquid crystal display panel.

20 Claims, 8 Drawing Sheets

(56) References Cited

U.S. PATENT DOCUMENTS

2013/0107186 A1   5/2013   Ando et al.
2019/0259784 A1   8/2019   Liu et al.

FOREIGN PATENT DOCUMENTS

| CN | 113103071 A | 7/2021 |
| JP | S61174514 A | 8/1986 |
| JP | 2002258294 A | 9/2002 |
| JP | 2010026372 A | 2/2010 |
| JP | 2011169984 A | 9/2011 |

* cited by examiner

101 — providing a mother substrate, wherein the mother substrate includes at least one display device, the display device includes a first substrate, a second substrate, an adhesive layer and a sealant frame sealant, the adhesive layer and the sealant frame are between the first substrate and the second substrate, the display device is provided with a preset edge, the preset edge is between the adhesive layer and the sealant frame sealant 102 — cutting the mother substrate to obtain a single display device 103 — grinding the display device along the preset edge and removing the adhesive layer, to obtain the liquid crystal display panel

METHOD FOR MANUFACTURING A LIQUID CRYSTAL DISPLAY PANEL AND A LIQUID CRYSTAL DISPLAY PANEL

FIELD OF INVENTION

The present disclosure relates to the technical field of displays, and in particular to a method for manufacturing a liquid crystal display panel and a liquid crystal display panel.

BACKGROUND OF DISCLOSURE

Nowadays, the liquid crystal displays (LCD) on the market have diversified shapes. In order to enhance the visual impact, in addition to the traditional rectangular panels, various manufacturers have also developed special-shaped panels with curved or beveled corners. These special-shaped designs are generally used in commercial display panels and automotive panels. In the manufacturing process, the special-shaped panels could be cut by blade wheel cutting or laser cutting. However, due to the fact that the LCD has a double-layer glass structure, there is a hidden danger of misalignment of upper and lower sides or cracks at the edges when the special shapes are treated with the blade wheel cutting or laser cutting. Therefore, at present, the method of grinding after cutting is used to form a uniform and neat end surface.

However, in the actual grinding process, due to the vibration of the grinding wheel, there is a risk of peeling of a frame sealant between the upper and lower substrates, which may result in ruptures. In order to reduce the above risks, the amount of grinding could be reduced, and the speed of grinding could be lowered. However, lowering the grinding speed will result in a longer grinding time, which is not benefit to mass production.

SUMMARY OF INVENTION

Technical Problem

In view of this, the purpose of the present disclosure is to provide a method for manufacturing a liquid crystal display panel and a liquid crystal display panel which could prevent the frame sealant between the upper and lower substrates from peeling off during the grinding process.

Technical Solutions

The present disclosure provides a method of manufacturing a liquid crystal display panel, comprising steps of:
providing a mother substrate, wherein the mother substrate includes at least one display device, the display device includes a first substrate, a second substrate, an adhesive layer and a frame sealant, the adhesive layer and the frame sealant are between the first substrate and the second substrate, the display device includes a display area, the frame sealant is between the display area and the adhesive layer, and the frame sealant and the adhesive layer are arranged at interval, the display device is provided with a preset edge, the preset edge is between the adhesive layer and the frame sealant;
cutting the mother substrate to obtain a single display device;
grinding the display device along the preset edge and removing the adhesive layer, to obtain the liquid crystal display panel.

In an embodiment, the preset edge includes a first section to be formed, the adhesive layer extends along an extending direction of the first section to be formed.

In an embodiment, a starting point of an orthogonal projection of the adhesive layer on the first substrate is aligned with or goes beyond a starting point of the first section to be formed, and an end point of the orthogonal projection of the adhesive layer on the first substrate is aligned with or goes beyond an end point of the first section to be formed.

In an embodiment, the preset edge further includes a second section to be formed and a connection section, the connection section is connected between the first section to be formed and the second section to be formed, the adhesive layer extends along an extending direction of the first section to be formed, the connection section and the second section to be formed, and a starting point of an orthogonal projection of the adhesive layer on the first substrate is aligned with or goes beyond a starting point of the first section to be formed, the connection section and the second section to be formed, and an end point of the orthogonal projection of the adhesive layer on the first substrate is aligned with or goes beyond an end point of the first section to be formed, the connection section and the second section to be formed.

In an embodiment, the adhesive layer is arranged around the preset edge and forms a closed shape.

In an embodiment, the preset edge includes a first section to be formed and a first section, the first section is connected to one end of the first section to be formed, the adhesive layer includes a first adhesive part, the first adhesive part extends along an extending direction of the first section.

In an embodiment, the preset edge further includes a second section, the second section is connected to the other end of the first section to be formed, the adhesive layer includes a second adhesive part, the second adhesive part extends along an extending direction of the second section.

In an embodiment, in the step of grinding the display device along the preset edge and removing the adhesive layer, the first section to be formed is grinded firstly, and then the adhesive layer is removed.

In an embodiment, the first section to be formed is located at a corner of the preset edge.

In an embodiment, the first section to be formed and the first section to be formed are both located at corners of the preset edge.

In an embodiment, in the step of grinding the display device along the preset edge and removing the adhesive layer includes grinding the display device along the preset edge and removing the adhesive layer through an edge grinding.

In an embodiment, the outer edge of the adhesive layer has the same shape as the preset edge with the same extending direction of the adhesive layer.

In an embodiment, the adhesive layer further includes a plurality of adhesive parts arranged in an area outside the preset edge.

In an embodiment, a material of the adhesive layer is the same as that of the frame sealant, and a width of the adhesive layer ranges from 500 μm to 1000 μm.

The present disclosure also provides a method of manufacturing a liquid crystal display panel, comprising steps of:
providing a mother substrate, wherein the mother substrate includes at least one display device, the display device includes a first substrate, a second substrate, an adhesive layer and a frame sealant, the adhesive layer and the frame sealant are between the first substrate and the second substrate, the display device includes a display area, the frame sealant is between the display area and the adhesive layer, and the frame sealant and the adhesive layer are arranged at interval, the display device is provided with a preset edge, the preset edge is between the adhesive layer and the frame sealant, the preset edge includes a first section to be formed, the adhesive layer extends along an extending direction of the first section to be formed, the first section to be formed is located at a corner of the preset edge;

cutting the mother substrate to obtain a single display device;

grinding the display device along the preset edge and removing the adhesive layer, to obtain the liquid crystal display panel.

The present disclosure provides a liquid crystal display panel, wherein the liquid crystal display panel is manufactured by the method of manufacturing a liquid crystal display panel according to any item as above, the liquid crystal display panel includes a first substrate, a second substrate, and a frame sealant, the frame sealant is between the first substrate and the second substrate, the liquid crystal display panel has a speacial-shaped edge.

Beneficial Effect

The method for manufacturing a liquid crystal display panel of the present disclosure is to provide an adhesive layer between the first substrate and the second substrate of the display device, and the adhesive layer is arranged outside the preset edge, the adhesive layer plays a role of bonding and strengthening the first substrate and the second substrate during the process of grinding the display device along the preset edge, such that the peeling between the first substrate and the second substrate could be prevented, the braking of the first substrate and the second substrate could be prevented, and therefore the display device could be protected. Through the liquid crystal display panel manufactured by the method for manufacturing a liquid crystal display panel, the peeling between the first substrate, the second substrate and the frame sealant during the forming process could be prevented, and the reliability and stability of the liquid crystal display panel could be enhanced.

BRIEF DESCRIPTION OF DRAWINGS

In order to explain the technical solutions in this disclosure more clearly, the following will briefly introduce the drawings needed in the description of the embodiments. Obviously, the drawings in the following description are only some embodiments of the disclosure. For those skilled in the art, without creative work, other drawings can be obtained from these drawings.

DETAILED DESCRIPTION OF PREFERRED EMBODIMENTS

Hereinafter, the embodiments of the present disclosure are clearly and completely described in conjunction with the attached drawings. Obviously, the embodiments described below are only partial embodiments of the present disclosure but not all of them. Based on the embodiments described in the present disclosure, all other embodiments acquired by a person having ordinary skill in the art without creative work fall within the scope of the protection of the present disclosure.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

Please refer to FIGS. 1 to 4 together. The method for manufacturing a liquid crystal display panel provided by the present disclosure comprises steps of:

Step 101: providing a mother substrate 1, wherein the mother substrate 1 includes at least one display device 100, the display device 100 includes a first substrate 10, a second substrate 20, an adhesive layer 30 and a frame sealant 40, the adhesive layer 30 and the frame sealant 40 are between the first substrate 10 and the second substrate 20, the display device 100 is provided with a preset edge E, and the preset edge E is between the adhesive layer 30 and the frame sealant 40.

Figure 2:
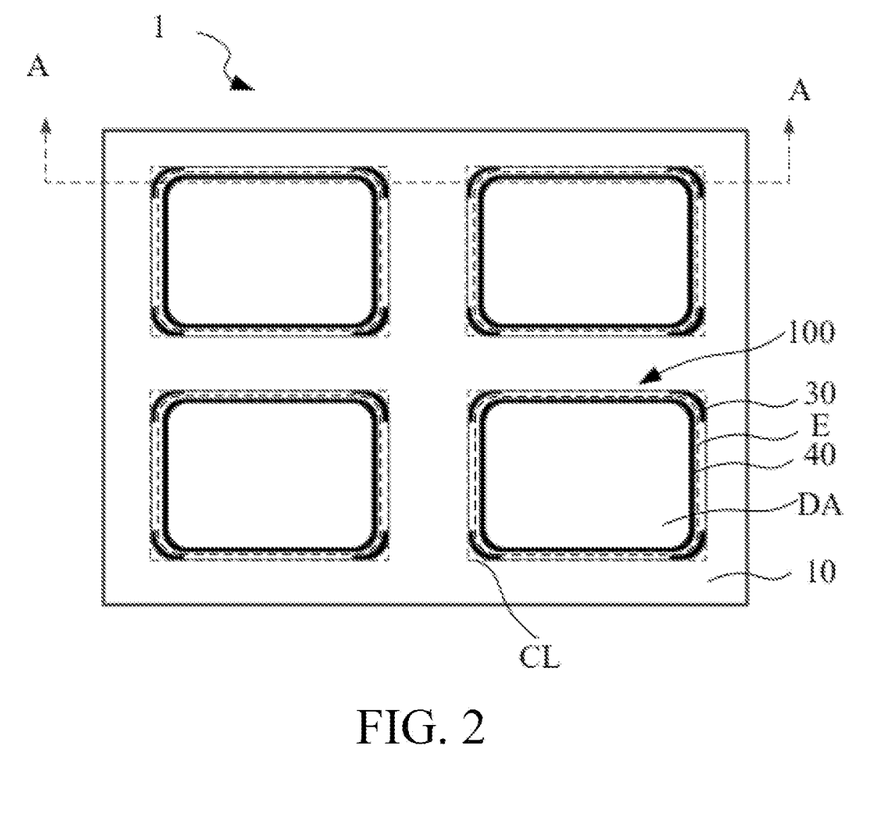
FIG. 2 is a schematic top view of the mother substrate according to a first embodiment of the present disclosure.
Figure 3:
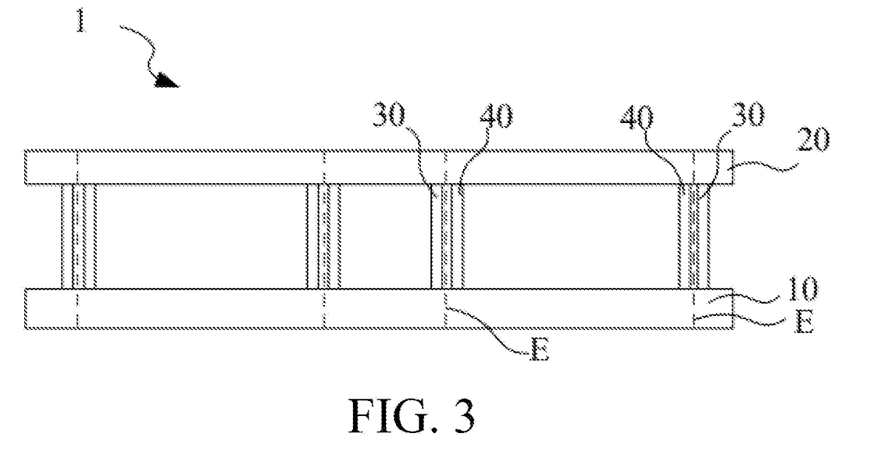
FIG. 3 is a cross-sectional view of the mother substrate of FIG. 2 taken along line A-A.

In step 101, when the mother substrate 1 includes a plurality of display devices 100, the plurality of display devices 100 may be arranged in a matrix. After the mother substrate 1 is cut along the cutting line CL, a single display device 100 can be obtained. In this embodiment, the mother substrate 1 includes four display devices 100 as an example for description. The first substrate 10 may be an array substrate, and the second substrate 20 may be a color filter substrate. Alternatively, the first substrate 10 is a color filter substrate, and the second substrate 20 is an array substrate. The first substrate 10 and the second substrate 20 are bonded to each other by a frame sealant 40 and an adhesive layer 30.

Figure 5A:
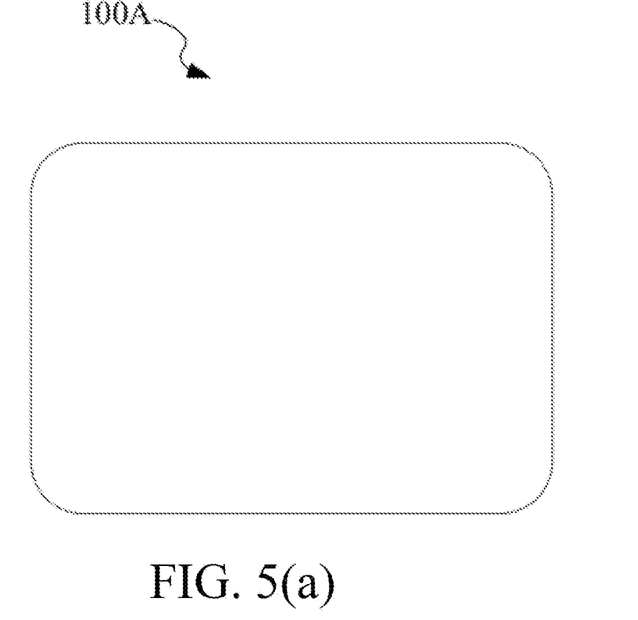
FIG. 5(a) is a schematic top view of a special-shaped liquid crystal display panel of the present disclosure.
Figure 5B:
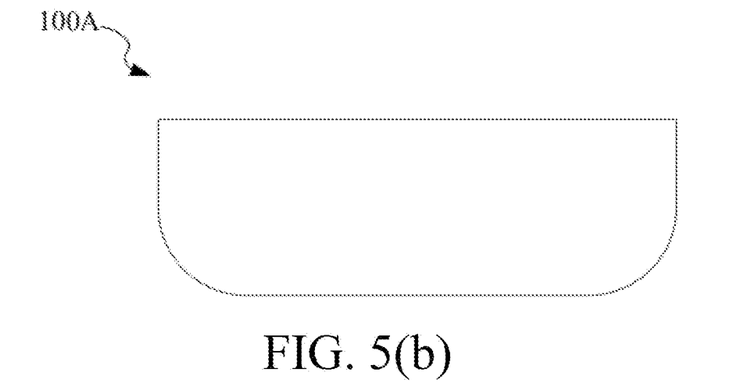
FIG. 5(b) is a schematic top view of another special-shaped liquid crystal display panel of the present disclosure.

Please refer to FIG. 5(a). The liquid crystal display panel 100A of the present disclosure is a special-shaped display panel with special-shaped edges. The special shape refers to a shape that is not rectangular. The special shape may be a shape including a curve, or a shape including a multi-section polyline, or the like. The present disclosure takes a rounded rectangle as an example for description. Please refer to FIG. 5(b). The shape of the special-shaped liquid crystal display panel 100A may also be a rectangle with only two rounded corners.

Please refer to FIGS. 2 to 4 again. The display device 100 includes a display area DA. The frame sealant 40 is arranged around the display area DA. The preset edge E is located on a side of the frame sealant 40 away from the display area DA. That is, the frame sealant 40 is between the display area DA and the preset edge E. The adhesive layer 30 is located on a side of the preset edge E away from the frame sealant 40.

Figure 4:
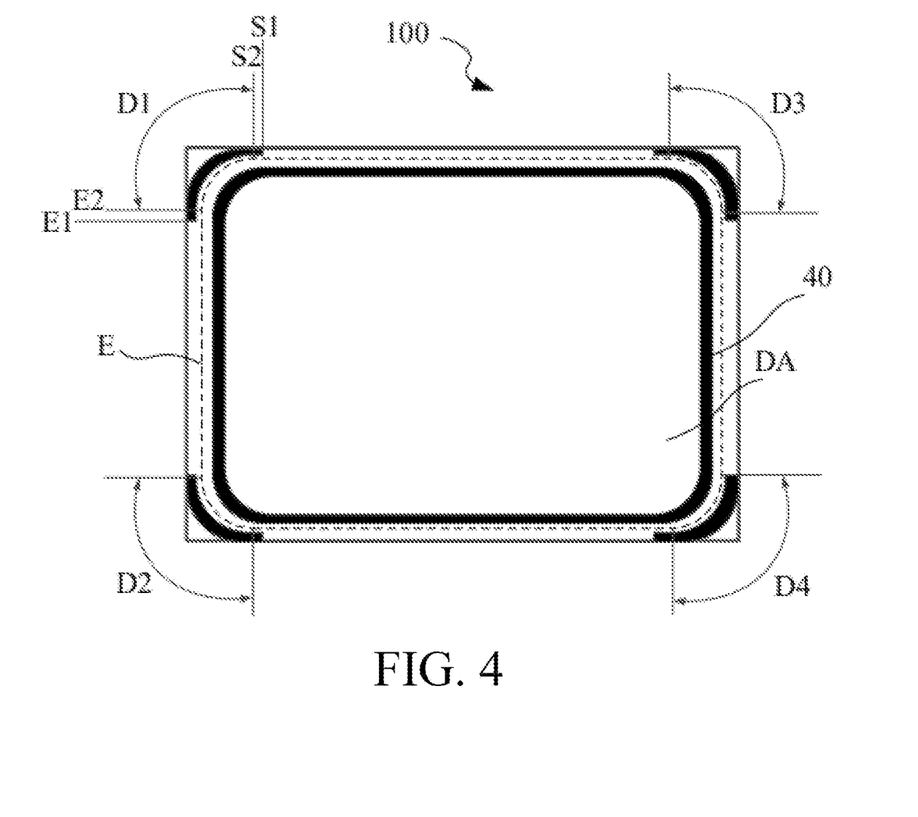
FIG. 4 is a schematic top view of the display device in the mother substrate of FIG. 2.

The shape of the display area DA is the same as the shape of the preset edge E. The display area DA is arranged to include switching elements, pixel electrodes, common electrodes, alignment films, color film layers, black matrixes or the like.

The frame sealant 40 is used for bonding the first substrate 10 and the second substrate 20 such that a liquid crystal cell is formed. The shape of the frame sealant 40 may match the shape of the display area DA.

The display device 100 may be grinded along the preset edge E such that the liquid crystal display panel 100A to be manufactured to obtained. The preset edge E includes the section to be formed. The section to be formed is a part of the display device 100 that needs to be further changed in shape. The section to be formed corresponds to the special-shaped portion of the liquid crystal display panel 100A to be manufactured. That is, a non-linear section such as a curve or a multi-section broken line. The shape of the liquid crystal display panel 100A to be manufactured in FIG. 4 is a rectangle with rounded corners, and the preset edge E has a first section to be formed D1, a second section to be formed D2, a third section to be formed D3 and a fourth section to be formed D4. The first section to be formed D1, the second section to be formed D2, the third section to be formed D3 and the fourth section to be formed D4 are located at the four corners of the preset edge E. In particular, the first section to be formed D1, the second section to be formed D2, the third section to be formed D3 and the fourth section to be formed D4 are respectively four arcs at four corners of a rectangle. In the present disclosure, the first section to be formed D1, the second section to be formed D2, the third section to be formed D3 and the fourth section to be formed D4 are collectively referred to as the section to be formed.

The adhesive layer 30 is used to strengthen the adhesion between the first substrate 10 and the second substrate 20. The adhesive layer 30 and the frame sealant 40 are arranged at interval. Optionally, the adhesive layer 30 and the frame sealant 40 may be separated from each other. The adhesive layer 30 may also be connected to the frame sealant 40, as long as there is a gap between the adhesive layer 30 and the frame sealant 40 such that they are not completely connected together. The distance between the frame sealant 40 and the adhesive layer 30 may be designed to be greater than or equal to 500 μm. The reason is: due to process limitations, the coating position of the adhesive layer 30 may deviate from the design value, such as sealant overflow or coating errors caused by equipment movement. Taking these two factors into account, the distance between the frame sealant 40 and the adhesive layer 30 may be designed to be greater than or equal to 500 μm, such that the adhesion between the main frame sealant 40 and the adhesive layer 30 due to process errors would be prevented.

Further, the adhesive layer 30 is located outside the preset edge E, that is, the adhesive layer 30 is located on a side of the preset edge E away from the display area DA. The adhesive layer 30 may extend along an extending direction of the section to be formed. Hereinafter, the structure of the first section to be formed D1 is taken as an example to describe the adhesive layer 30. It can be understood that the structure of the second section to be formed D2, the third section to be formed D3 and the fourth section to be formed D4 could be constructed as the structure of the first section to be formed D1. The adhesive layer 30 may extend along an extending direction of the first section to be formed D1. Optionally, an orthogonal projection of the adhesive layer 30 on a plane where the first substrate 10 is located may surround the first section to be formed D1 from the outside. In particular, a starting point S1 of the orthogonal projection of the adhesive layer 30 on the plane where the first substrate 10 is located is aligned with or goes beyond a starting point S2 of the first section to be formed D1, and an end point E1 of the orthogonal projection of the adhesive layer 30 on the plane where the first substrate 10 is located is aligned with or goes beyond an end point E2 of the first section to be formed D1.

Figure 6:
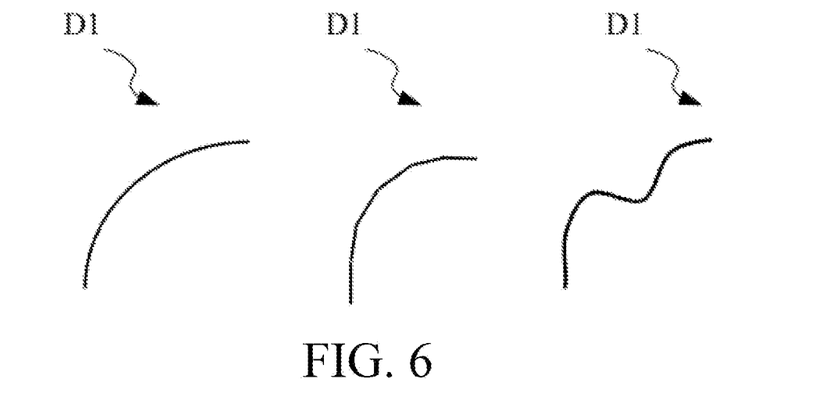
FIG. 6 is a schematic diagram of the shape of an adhesive layer of a display device according to an another embodiment of the present disclosure.

The shape of the edge of the adhesive layer 30 away from the display area DA may be the same as the shape of the first section to be formed D1. Further, the shape of the adhesive layer 30 may be the same as the shape of the first section to be formed D1. Please refer to FIG. 6. For example, when the first section to be formed D1 is a circular arc, the shape of the adhesive layer 30 is also a circular arc. When the first section to be formed D1 is a line section composed of multiple fold lines, the shape of the adhesive layer 30 is also the same line section composed of multiple fold lines. When the first section to be formed D1 is a curve formed by multiple connected arcs, the shape of the adhesive layer 30 is also a curve formed by multiple connected arcs.

Figure 7:
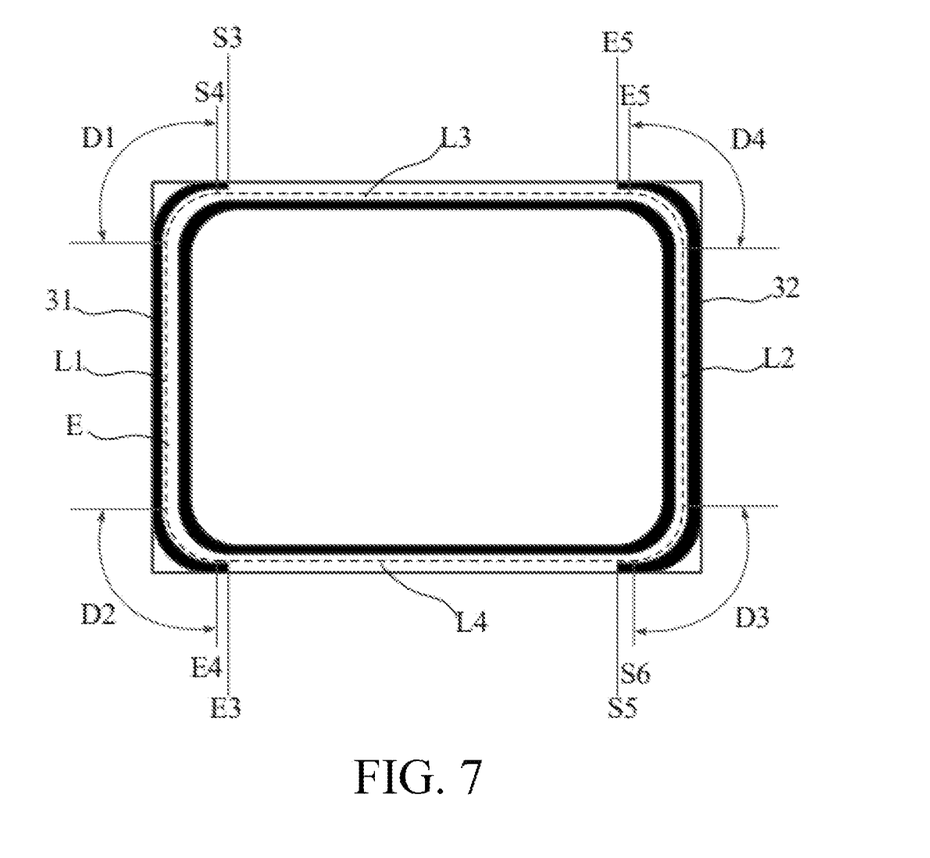
FIG. 7 is a schematic top view of the display device of the mother substrate according to a second embodiment of the present disclosure.

Please Refer to FIG. 7. The first section to be formed D1 and the second section to be formed D2 of the preset edge E are arranged in a vertical direction. The third section to be formed D3 and the fourth section to be formed D4 are arranged in a vertical direction. The second section to be formed D2 and the third section to be formed D3 are arranged in a horizontal direction. The first section to be formed D1 and the fourth section D4 to be formed are arranged in a horizontal direction. The preset edge E further includes a first connection section L1, a second connect section L2, a third connection section L3 and a fourth connection section L4. The first connection section L1 is connected between the first section to be formed D1 and the second section to be formed D2. The second connection section L2 is connected between the third section to be formed D3 and the fourth section to be formed D4. The third connection section L3 is connected between the first section to be formed D1 and the fourth section to be formed D4. The fourth connection section L4 is connected between the second section to be formed D2 and the third section to be formed D3. The adhesive layer 30 includes a first adhesive part 31 and a second adhesive part 32. The first adhesive part 31 extends along an extending direction of the first section to be formed D1, the first connection section L1 and the second section to be formed D2, and the first adhesive part 31 surrounds the first section to be formed D1, the first connection section L1 and the second section to be formed D2 from the outside on the orthogonal projection of the first substrate 10. That is, the first adhesive part 31 extends along an extending direction of the first section to be formed D1, the connection section L1 and the second section to be formed D2, and a starting point S3 of an orthogonal projection of the first substrate 10 of the first adhesive part 31 is aligned with or goes beyond a starting point S4 of the first section to be formed D1, the connection section L1 and the second section to be formed D2, an end point E3 of the orthogonal projection of the first substrate 10 of the first adhesive part 31 is aligned with or goes beyond an end point E4 of the first section to be formed D1, the connection section L1 and the second section to be formed D2. The second adhesive part 32 extends along an extending direction of the third section to be formed D3, the second connection section L2 and the fourth section to be formed D4, and the second adhesive layer 30 surrounds the third section to be formed D3, the second connection section L2 and the fourth section to be formed D4 from the outside on the orthogonal projection of the first substrate 10. That is, the second adhesive part 32 extends along an extending direction of the third section to be formed D3, the second connection section L2 and the fourth section to be formed D4, and a starting point S5 of the orthogonal projection of the first substrate 10 of the second adhesive part 32 is aligned with or goes beyond an starting point S6 of the third section to be formed D3, an end point E5 of the orthogonal projection the first substrate 10 of the first substrate 10 of the second adhesive part 32 is aligned with or goes beyond an end point E6 of the third section D3, the second connection section L2 and the fourth section D4 to be formed. In addition, the first adhesive part 31 and the second adhesive part 32 respectively extend along two short sides of the display device 100, and surround the first to be formed section D1 to the fourth to be formed section D4 from the outside. It can be understood that the adhesive layer 30 may also only include the first adhesive part 31 or the second adhesive part 32. Alternatively, the first adhesive part 31 extends along an extending direction of the first section to be formed D1, the third connection section L3 and the fourth section to be formed D4, the second adhesive part 32 extends along an extending direction of the second section to be formed D2, and the fourth connection section L4 and the third section to be formed D3, such that the four sections to be formed could be protected. That is, the first adhesive part 31 and the second adhesive part 32 respectively extend along the two long sides of the display device 100 and surround the first section to be formed D1 to the fourth section to be formed D4 from the outside.

Figure 8:
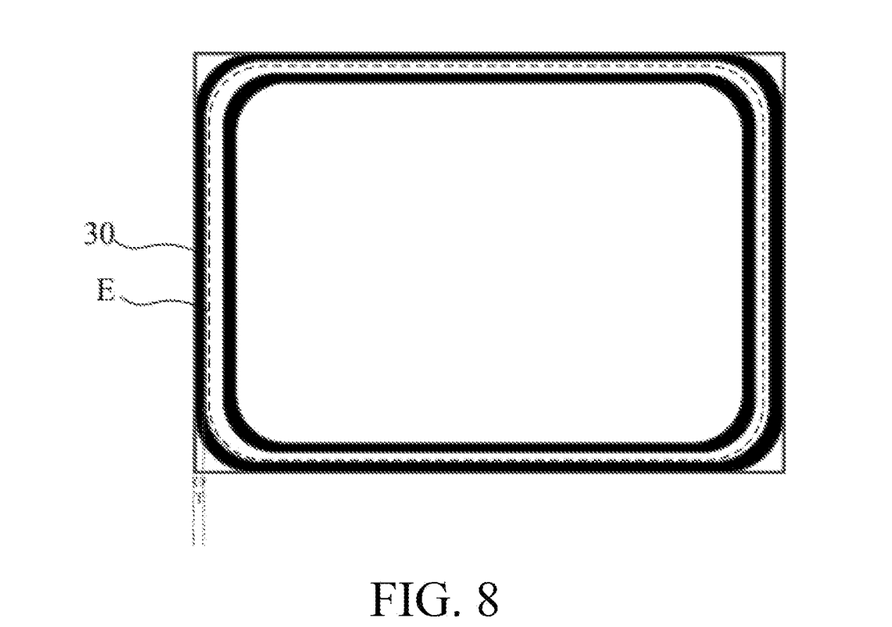
FIG. 8 is a schematic top view of the display device of the mother substrate according to a third embodiment of the present disclosure.

Please refer to FIG. 8. The adhesive layer 30 may also be arranged around the preset edge E and form a closed shape. The adhesive layer 30 may surround the preset edge E in one circle, or may surround the preset edge E in multiple circles.

Figure 9:
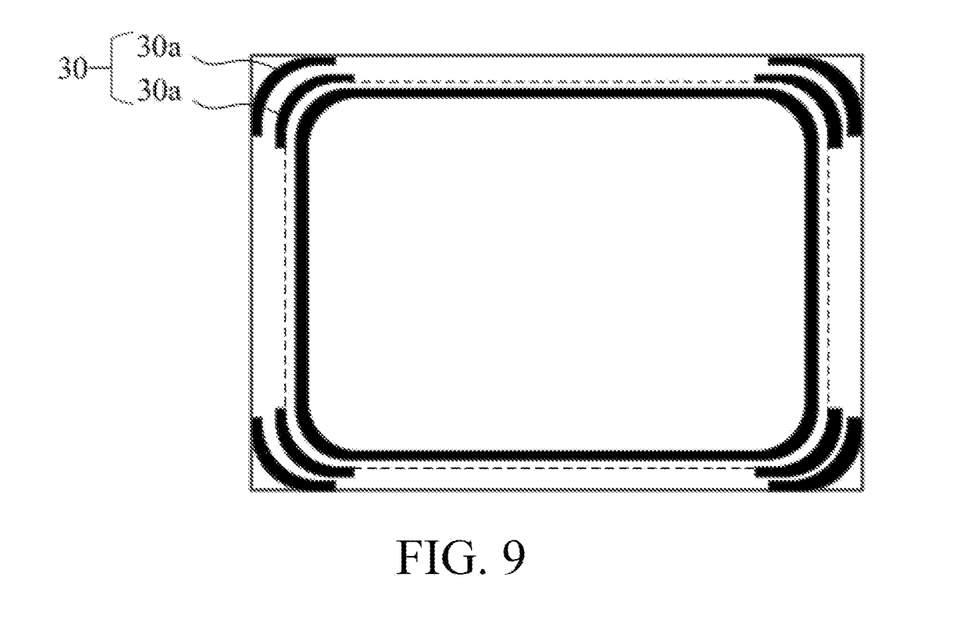
FIG. 9 is a schematic top view of the display device of the mother substrate according to a fourth embodiment of the present disclosure.

Please refer to FIG. 9. The adhesive layer 30 may further include a plurality of sub-adhesive parts 30a. The plurality of sub-adhesive parts 30a are arranged side by side in a region outside the preset edge E. In particular, the plurality of sub-adhesive parts 30a are arranged at intervals along a direction from a position close to the display area DA toward a position away from the display area DA. The plurality of sub-adhesive parts 30a may also be connected. Through arranging the plurality of sub-adhesive parts 30a, the reinforcing effect of the first substrate 10 and the second substrate 20 could be enhanced.

A material of the adhesive layer 30 may be the same material as the frame sealant 40. Further, a width of the adhesive layer 30 may range from 500 μm to 1000 μm. It should be noted that when the adhesive layer 30 includes a plurality of adhesive parts or sub-adhesive parts, the width of the adhesive layer 30 refers to the width of each adhesive part or sub-adhesive part. When the width of the adhesive layer 30 is too small, the bonding effect is not strong enough, and when the width of the adhesive layer 30 is too large, it will increase the difficulty of coating. Moreover, when the width of the adhesive layer 30 may range from 500 μm to 1000 μm, the adhesive layer 30 could be obtained through one coating using the same equipment and material as the frame sealant 40, such that the manufacturing process could be simplified. It can be understood that the material of the adhesive layer 30 may also be optically clear adhesive (OCA) or double-sided adhesive. The present disclosure does not limit the material of the adhesive layer 30.

Figure 1:
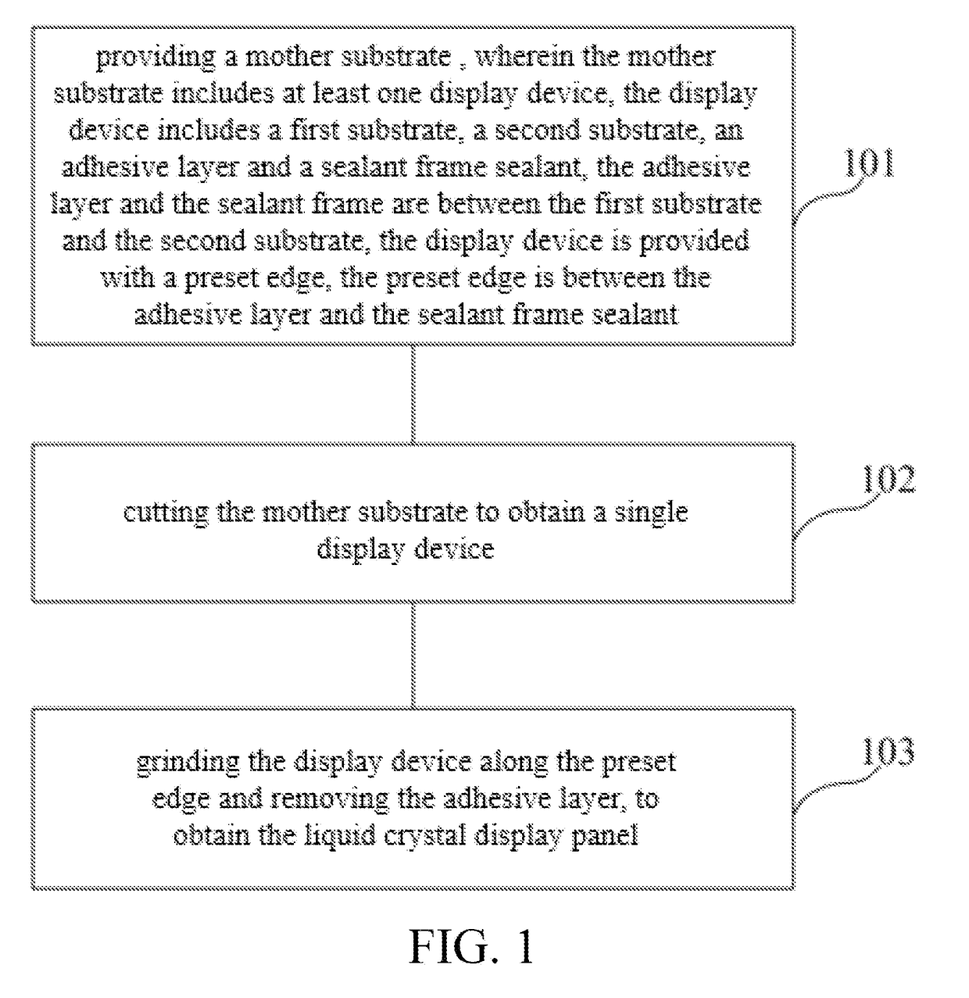
FIG. 1 is a flowchart of a method for manufacturing a liquid crystal display panel of the present disclosure.

Step 102: cutting the mother substrate 1 to obtain a single display device 100.

When manufacturing a liquid crystal display panel 100A, the mother substrate 1 generally includes more than two display devices 100. The mother substrate 1 is cut along the cutting line CL, and a single display device 100 could be obtained, and then the display device 100 is grinded. The display device 100 obtained through cutting may be rectangular.

Step 103: grinding the display device 100 along the preset edge E and removing the adhesive layer 30, to obtain the liquid crystal display panel 100A.

Figure 10:
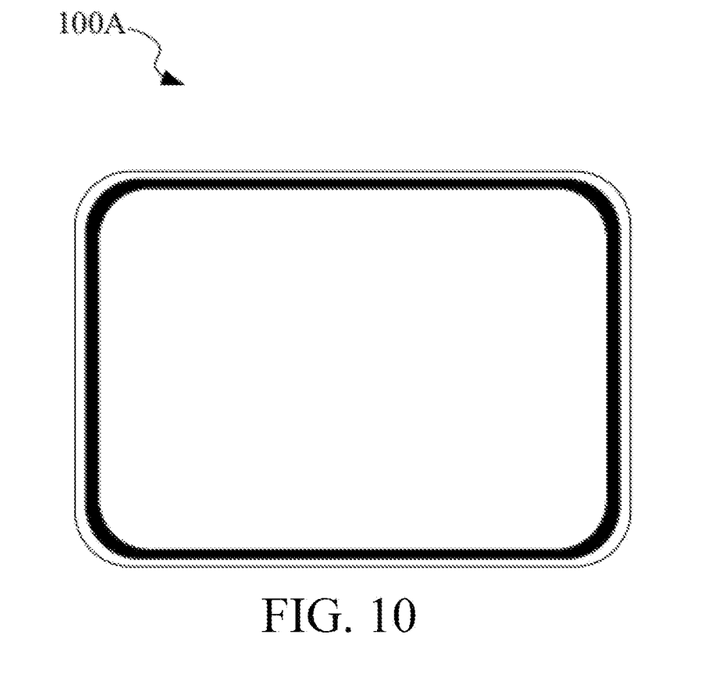
FIG. 10 is a schematic top view of a liquid crystal display panel of the present disclosure obtained by grinding the display device.

In step 103, the method for shaping and grinding the display device 100 along the preset edge E may be computer numerical control (CNC, numerically controlled machine tool) grinding. The path of CNC grinding may be to grind around the display device 100 for at least one circle, or to grind the section to be formed firstly and then grind the area outside the section to be formed, or to grind the area outside the section to be formed firstly and then grind the section to be formed. Since the adhesive layer 30 is arranged in the section to be formed, the adhesive layer 30 could be ground off while the section to be formed is grinded at the same time through the arrangement of the grinding amount. In particular, as shown in FIG. 4, the section to be formed is a rectangular right-angled part, and the rectangular right-angled part could be ground into a rounded corner by CNC edge grinding. In the process of grinding the display device 100, the adhesive layer 30 may be ground away together such that the liquid crystal display panel as shown in FIG. 10 is obtained.

The grinding path of the section to be formed is determined by its shape. When the section to be formed is an arc, the grinding path is arranged as an arc. For the portion where the edge of the display device 100 is a straight line, the grinding jig only needs to slightly grind along the edge of the display device 100. When the grinding jig is grinding along the preset grinding path, due to the fact that the shape of the section to be formed (right angle) is different from the preset grinding path (rounded corner). a centripetal force is generated to influence the display device 100 during the process of grinding, resulting in the vibration of the display device 100, the peeling between the first substrate 10, the second substrate 20 and the frame sealant 40, and even the breaking of the first substrate 10 and the second substrate 20. By arranging the adhesive layer 30 between the first substrate 10 and the second substrate 20, the first substrate 10 and the second substrate 20 of the section to be formed are adhered, The peeling of the first substrate 10, the second substrate 20 and the frame sealant 40 due to the vibration of the first substrate 10 and the second substrate 20 is prevented. Moreover, the force received by the first substrate 10 and the second substrate 20 is transmitted to the adhesive layer 30, such that the first substrate 10 and the second substrate 20 is further prevented from being shattered and therefore broken. In addition, by removing the adhesive layer 30, the narrow frame effect could be ensured.

By arranging the adhesive layer 30 and the frame sealant 40 to be separated from each other, the force received by the adhesive layer 30 will not be transmitted to the frame sealant 40, such that the frame sealant 40 could be prevented from being affected by vibration and therefore the separation of the first substrate and the second substrate could be prevented.

When the shape of the edge of the adhesive layer 30 away from the display area DA is arranged to be the same as the shape of the preset edge E of the section to be formed, the adhesive layer 30 is located on the grinding path. Compared with the arrangement protruding from the grinding path, the adhesive layer 30 located on the grinding path is less difficult to grind, thereby shortening the grinding time.

The adhesive layer 30 surrounds the section to be formed from the outside on the orthogonal projection of the plane where the first substrate 10 is located, and therefore the adhesive layer 30 could protect the entire range of the section to be formed which is subject to the greatest vibration.

According to the embodiments of FIGS. 7 to 9, through expanding the range of the adhesive layer 30 or increasing the number of the adhesive layer 30, the protective effect of the adhesive layer 30 on the first substrate 10 and the second substrate 20 could be further improved.

Figure 11:
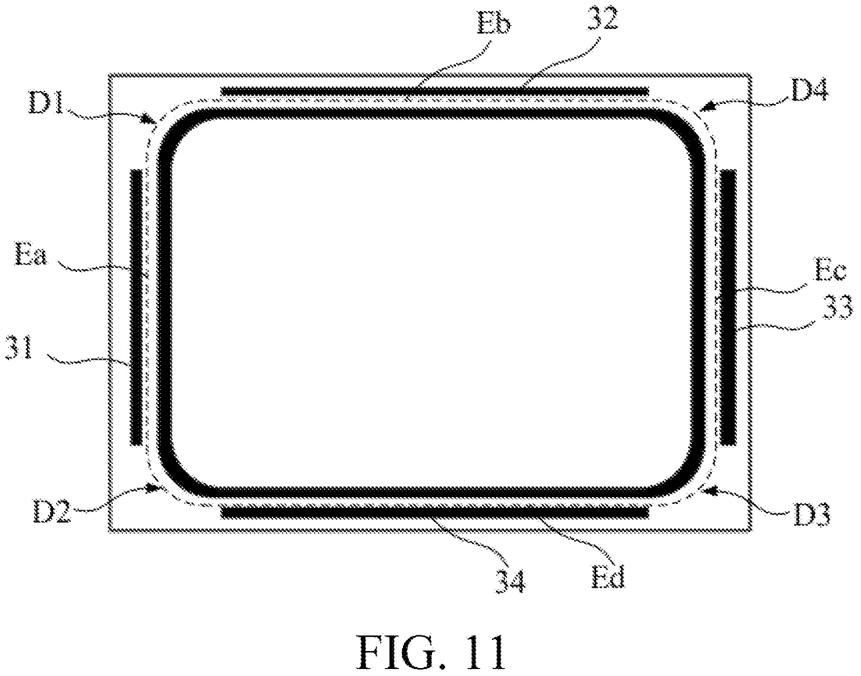
FIG. 11 is a schematic top view of a display device of a mother substrate according to a fifth embodiment of the present disclosure.

Please refer to FIG. 1, FIG. 3, and FIG. 11 together. The method for manufacturing a liquid crystal display panel 100A according to the second embodiment of the present disclosure comprises steps of:

Step 201: providing a mother substrate 1, wherein the mother substrate 1 includes at least one display device 100, the display device 100 includes a first substrate 10, a second substrate 20, an adhesive layer 30 and a frame sealant 40, the adhesive layer 30 and the frame sealant 40 are between the first substrate 10 and the second substrate 20, the display device 100 is provided with a preset edge E, and the preset edge E is between the adhesive layer 30 and the frame sealant 40.

The content that the step 201 differs from the step 101 is:

The preset edge E has a first section to be formed D1, a second section to be formed D2, a third section to be formed D3 and a fourth section to be formed D4. The preset edge E further has a first section Ea, a second section Eb, a third section Ec and a fourth section Ed. Wherein, an end of the first section to be formed D1 is connected to the first section Ea, and the other end is connected to the second section Eb. An end of the second section D2 to be formed is connected to the first section Ea, and the other end is connected to the fourth section Ed. An end of the third section D3 to be formed is connected to the fourth section Ed, and the other end is connected to the third section Ec. An end of the fourth section D4 to be formed is connected to the third section Ec, and the other end is connected to the second section Eb. The adhesive layer 30 includes a first adhesive part 31, a second adhesive part 32, a third adhesive part 33 and a fourth adhesive part 34. The first adhesive part 31 extends along an extending direction of the first section Ea. The second adhesive part 32 extends along an extending direction of the second section Eb. The third adhesive part 33 extends along an extending direction of the third section Ec. The fourth adhesive part 34 extends along an extending direction of the fourth section Ed. The first adhesive part 31 and the second adhesive part 32 are located on both sides of the first section to be formed D1 for protecting the display device 100 at the first section to be formed D1 during the forming process. The second adhesive part 32 and the third adhesive part 33 are located on both sides of the second section to be formed D2 for protecting the display device 100 at the second section to be formed D2 during the forming process, and so on. It can be understood that the adhesive layer 30 may also include only one of the first adhesive part 31 to the fourth adhesive part 34.

Step 202: cutting the mother substrate 1 to obtain a single display device 100.

The step 202 may refer to the step 102, which will not be repeated here.

203: grinding the display device 100 along the preset edge E and removing the adhesive layer 30, to obtain the liquid crystal display panel 100A.

In step 203, the first section to be formed D1 is grinded firstly, and then the adhesive layer 30 is removed. The method of grinding the section to be formed may be CNC grinding. The method of removing the adhesive layer 30 may also be CNC grinding. By CNC grinding the first section to be formed D1 firstly, under the condition that the first substrate 10 and the second substrate 20 are bonded by the adhesive layer 30, the first section to be formed D1 is CNC grinded. Since the force of CNC grinding could be decomposed into the component forces along the extending direction of the first section Ea and the second section Eb, therefore the first adhesive part 31 and the second adhesive part 32 extending along the extending direction of the first section Ea and the second section Eb could reduce the force of the grinding vibration on the first substrate 10 and the second substrate 20, such that the peeling between the first substrate 10, the second substrate 20 and the frame sealant 40 is prevented, and the ruptures is prevented. Similarly, the first adhesive part 31, the second adhesive part 32, the third adhesive part 33 and the fourth adhesive part 34 cooperate with each other to protect the display device 100 during the forming process. Optionally, the adhesive layer 30 may also be removed by other means after the grinding treatment of the section to be formed, for example, scraped off with a squeegee, and is not limited to being removed simultaneously during the forming process of the display device 100.

In a second embodiment of the method for manufacturing a liquid crystal display panel of the present disclosure, the display device 100 could be also protected during the forming process through forming the adhesive part adjacent to the section to be formed, instead of directly forming the adhesive part at the section to be formed.

Please refer to FIGS. 3 and 10 again. The present disclosure also provides a liquid crystal display panel 100A, which is manufactured by the method for manufacturing a liquid crystal display panel as described above. The liquid crystal display panel 100A includes a first substrate 10, a second substrate 20 and a frame sealant 40. The frame sealant 40 is between the first substrate 10 and the second substrate 20, and the liquid crystal display panel 100A has special-shaped edges.

Through the liquid crystal display panel manufactured by the method for manufacturing a liquid crystal display panel, the peeling between the first substrate, the second substrate and the frame sealant during the forming process could be prevented, and the reliability and stability of the liquid crystal display panel could be enhanced.

The method for manufacturing a liquid crystal display panel of the present disclosure is to provide an adhesive layer between the first substrate and the second substrate of the display device, and the adhesive layer is arranged outside the preset edge, the adhesive layer plays a role of bonding and strengthening the first substrate and the second substrate during the process of grinding the display device along the preset edge, such that the peeling between the first substrate and the second substrate could be prevented, and the braking of the first substrate and the second substrate could be prevented, therefore the display device could be protected.

According to an embodiment of the present disclosure, by arranging an adhesive layer outside the section to be formed, such that the display device could be protected. At the same time, the adhesive layer could be removed in the grinding process of the section to be formed, such that the effect of a narrow border could be achieved.

According to an embodiment of the present disclosure, by arranging an adhesive layer at a position adjacent to the section to be formed, the section to be formed is grinded firstly, and then the adhesive layer is removed, such that the display device could also be protected.

The above provides a detailed introduction to the implementation of the present disclosure, and specific examples are used in the description to describe the principles and implementations of the present disclosure, and the description of the implementations above is only used to help understand the present disclosure. At the same time, for those of ordinary skill in the art, according to the idea of the present disclosure, there will be changes in the specific implementation and the scope of the present disclosure. In summary, the content of this specification should not be construed as a limitation to the disclosure.

What is claimed is:

1. A method of manufacturing a liquid crystal display panel, comprising:
   providing a mother substrate, wherein the mother substrate comprises at least one display device,
      one display device of the at least one display device includes a first substrate, a second substrate, an adhesive layer and a frame sealant,
      the adhesive layer and the frame sealant are between the first substrate and the second substrate,
      the display device has a display area,
      the frame sealant is between the display area and the adhesive layer,
      the frame sealant and the adhesive layer are spaced apart from each other,
      the display device is provided with a preset edge, and the preset edge is between the adhesive layer and the frame sealant;
   cutting the mother substrate to obtain the display device; and
   grinding the display device along the preset edge and removing the adhesive layer, to obtain the liquid crystal display panel.

2. The method of manufacturing the liquid crystal display panel according to claim 1, wherein the preset edge comprises a first section to be formed, and the adhesive layer extends along an extension direction of the first section to be formed.

3. The method of manufacturing the liquid crystal display panel according to claim 2, wherein a starting point of an orthogonal projection of the adhesive layer on the first substrate is aligned with or goes beyond a starting point of the first section to be formed, and an end point of the orthogonal projection of the adhesive layer on the first substrate is aligned with or goes beyond an end point of the first section to be formed.

4. The method of manufacturing the liquid crystal display panel according to claim 2, wherein the preset edge further comprises a second section to be formed and a connection section, the connection section is connected between the first section to be formed and the second section to be formed,
   the adhesive layer extends along an extending direction of the first section to be formed, the connection section, and the second section to be formed,
   a starting point of an orthogonal projection of the adhesive layer on the first substrate is aligned with or goes beyond a starting point of the first section to be formed, the connection section, and the second section to be formed, and an end point of the orthogonal projection of the adhesive layer on the first substrate is aligned with or goes beyond an end point of the first section to be formed, the connection section, and the second section to be formed.

5. The method of manufacturing the liquid crystal display panel according to claim 2, wherein the adhesive layer is arranged around the preset edge and forms a closed shape.

6. The method of manufacturing the liquid crystal display panel according to claim 2, wherein the preset edge comprises a first section to be formed and a first section, the first section is connected to a first end of the first section to be formed,
   the adhesive layer comprises a first adhesive part, the first adhesive part extends along an extending direction of the first section.

7. The method of manufacturing the liquid crystal display panel according to claim 6, wherein the preset edge further comprises a second section, the second section is connected to a second end of the first section to be formed,
   the adhesive layer comprises a second adhesive part, and the second adhesive part extends along an extending direction of the second section.

8. The method of manufacturing the liquid crystal display panel according to claim 6, wherein grinding the display device along the preset edge and removing the adhesive layer comprises: grinding the first section to be formed and removing the adhesive layer.

9. The method of manufacturing the liquid crystal display panel according to claim 2, wherein the first section to be formed is located at a corner of the preset edge.

10. The method of manufacturing the liquid crystal display panel according to claim 3, wherein the first section to be formed is located at a corner of the preset edge.

11. The method of manufacturing the liquid crystal display panel according to claim 4, wherein the first section to be formed and the second section to be formed are both located at corners of the preset edge.

12. The method of manufacturing the liquid crystal display panel according to claim 5, wherein the first section to be formed is located at a corner of the preset edge.

13. The method of manufacturing the liquid crystal display panel according to claim 6, wherein the first section to be formed is located at a corner of the preset edge.

14. The method of manufacturing the liquid crystal display panel according to claim 7, wherein the first section to be formed is located at a corner of the preset edge.

15. The method of manufacturing the liquid crystal display panel according to claim 8, wherein the first section to be formed is located at a corner of the preset edge.

16. The method of manufacturing the liquid crystal display panel according to claim 1, wherein grinding the display device along the preset edge and removing the adhesive layer comprises: grinding the display device along the preset edge and removing the adhesive layer through an edge grinding.

17. The method of manufacturing the liquid crystal display panel according to claim 1, wherein the adhesive layer further comprises a plurality of adhesive parts arranged in an area outside the preset edge.

18. The method of manufacturing the liquid crystal display panel according to claim 1, wherein a material of the adhesive layer is the same as that of the frame sealant, and a width of the adhesive layer ranges from 500 μm to 1000 μm.

19. A method of manufacturing a liquid crystal display panel, comprising:
  providing a mother substrate, wherein the mother substrate includes at least one display device,
    a display device of the at least one display device comprises a first substrate, a second substrate, an adhesive layer and a frame sealant,
    the adhesive layer and the frame sealant are between the first substrate and the second substrate,
    the display device has a display area,
    the frame sealant is between the display area and the adhesive layer,
    the frame sealant and the adhesive layer are spaced apart from each other,
    the display device is provided with a preset edge, the preset edge is between the adhesive layer and the frame sealant,
    the preset edge comprises a first section to be formed, the adhesive layer extends along an extending direction of the first section to be formed, the first section to be formed is located at a corner of the preset edge;
  cutting the mother substrate to obtain the display device; and
  grinding the display device along the preset edge and removing the adhesive layer, to obtain the liquid crystal display panel.

20. A liquid crystal display panel, wherein the liquid crystal display panel is manufactured by the method of manufacturing a liquid crystal display panel according to claim 1, the liquid crystal display panel includes a first substrate, a second substrate, and a frame sealant, the frame sealant is between the first substrate and the second substrate, the liquid crystal display panel has a special-shaped.

* * * * *